(12) United States Patent
Zakrzewski et al.

(10) Patent No.: US 8,818,739 B2
(45) Date of Patent: Aug. 26, 2014

(54) MONITORING SYSTEMS AND METHODS FOR AIRCRAFT LANDING GEAR

(75) Inventors: Radoslaw R. Zakrzewski, South Burlington, VT (US); Michael A. Lynch, Shelburne, VT (US); Scott T. Fusare, Burlington, VT (US); Brandon Hicks, Ferrisburgh, VT (US); Bradley W. Baird, Grimsby (CA)

(73) Assignee: Goodrich Corporation, Charlotte, NC (US)

( * ) Notice: Subject to any disclaimer, the term of this patent is extended or adjusted under 35 U.S.C. 154(b) by 434 days.

(21) Appl. No.: 13/273,999

(22) Filed: Oct. 14, 2011

(65) Prior Publication Data

US 2012/0095703 A1      Apr. 19, 2012

Related U.S. Application Data

(60) Provisional application No. 61/455,170, filed on Oct. 15, 2010, provisional application No. 61/455,169, filed on Oct. 15, 2010, provisional application No. 61/393,456, filed on Oct. 15, 2010.

(51) Int. Cl.
*B64C 25/00* (2006.01)

(52) U.S. Cl.
CPC ............................... *B64C 25/00* (2013.01)
USPC ................................................... 702/42

(58) Field of Classification Search
CPC ................................................ B64C 25/00
USPC ........................................................ 702/42
See application file for complete search history.

(56) References Cited

U.S. PATENT DOCUMENTS

| 2,968,031 A | 1/1961 | Higa |
| 3,783,496 A | 1/1974 | Siler |
| 4,269,070 A | 5/1981 | Nelson et al. |
| 4,312,042 A | 1/1982 | Bateman |
| 4,480,480 A | 11/1984 | Scott et al. |
| 4,651,402 A | 3/1987 | Bonfils |
| 4,850,552 A | 7/1989 | Darden et al. |
| 5,010,775 A | 4/1991 | Choisnet |
| 5,205,514 A | 4/1993 | Patzig et al. |
| 5,314,115 A | 5/1994 | Moucessian |
| 5,358,637 A | 10/1994 | Hutzler et al. |
| 5,446,666 A | 8/1995 | Bauer |

(Continued)

FOREIGN PATENT DOCUMENTS

| DE | 3239877 A1 | 5/1984 |
| DE | 4035197 A1 | 1/1992 |

(Continued)

OTHER PUBLICATIONS

Extended Search Report issued Feb. 8, 2012 in connection with EP Application No. 11250852.8.

(Continued)

*Primary Examiner* — Bryan Bui
(74) *Attorney, Agent, or Firm* — Snell & WIlmer L.L.P.

(57) ABSTRACT

A system and method for monitoring loads applied to aircraft landing gear structure. The method includes the step of interrogating at least one sensor positioned proximate the landing gear structure by way of data acquisition circuitry to yield strain data. The method further includes the step of instructing the data acquisition circuitry with respect to a sampling rate and data resolution for interrogation.

12 Claims, 4 Drawing Sheets

(56) References Cited

U.S. PATENT DOCUMENTS

| | | |
|---|---|---|
| 5,477,740 A | 12/1995 | Shioya et al. |
| 5,518,206 A | 5/1996 | Arnold et al. |
| 5,815,091 A | 9/1998 | Dames et al. |
| 6,289,289 B1 | 9/2001 | Zweifel |
| 6,334,588 B1 | 1/2002 | Porte |
| 6,354,152 B1 | 3/2002 | Herlik |
| 6,676,075 B2 | 1/2004 | Cowan et al. |
| 6,745,153 B2 | 6/2004 | White et al. |
| 6,880,784 B1 | 4/2005 | Wilkinson et al. |
| 6,902,136 B2 | 6/2005 | Mackness |
| 6,951,145 B2 | 10/2005 | Kilmartin |
| 6,959,497 B2 | 11/2005 | Leidinger |
| 7,208,945 B2 | 4/2007 | Jones et al. |
| 7,589,645 B2 | 9/2009 | Schmidt |
| 7,680,630 B2 | 3/2010 | Schmidt |
| 7,747,396 B2 * | 6/2010 | El-Bakry et al. ............. 702/42 |
| 7,843,363 B2 | 11/2010 | Grichener et al. |
| 2002/0199131 A1 | 12/2002 | Kocin |
| 2003/0209063 A1 | 11/2003 | Adamson et al. |
| 2004/0011596 A1 | 1/2004 | Miller et al. |
| 2004/0012212 A1 | 1/2004 | Pratt et al. |
| 2004/0075022 A1 | 4/2004 | MacKness |
| 2004/0102918 A1 | 5/2004 | Stana |
| 2004/0129834 A1 | 7/2004 | Luce |
| 2004/0225474 A1 | 11/2004 | Goldfine et al. |
| 2005/0030010 A1 | 2/2005 | Jones et al. |
| 2006/0004499 A1 * | 1/2006 | Trego et al. ............. 701/29 |
| 2006/0038410 A1 | 2/2006 | Pratt et al. |
| 2007/0006662 A1 | 1/2007 | Giazotto |
| 2008/0036617 A1 * | 2/2008 | Arms et al. ............. 340/679 |
| 2009/0173823 A1 | 7/2009 | Shetzer |
| 2011/0285527 A1 * | 11/2011 | Arms et al. ............. 340/539.1 |
| 2012/0011946 A1 | 1/2012 | Eriksen et al. |
| 2012/0012700 A1 | 1/2012 | Eriksen et al. |
| 2012/0012701 A1 | 1/2012 | Eriksen et al. |
| 2012/0053784 A1 | 3/2012 | Schmidt et al. |

FOREIGN PATENT DOCUMENTS

| | | |
|---|---|---|
| EP | 0072634 A1 | 2/1983 |
| EP | 1839984 A1 | 10/2007 |
| GB | 2226416 A | 6/1990 |
| SU | 1469339 A1 | 3/1989 |
| WO | WO-0212043 A1 | 2/2002 |
| WO | WO-2004013785 A2 | 2/2004 |
| WO | WO-2006067442 A1 | 6/2006 |

OTHER PUBLICATIONS

Extended Search Report issued Feb. 4, 2010 in connection with European Patent Application No. 05808070.6.

Office Action issued Feb. 3, 2012 in connection with U.S. Appl. No. 13/271,468.

Partial Search Report issued Nov. 2, 2011 in connection with European Patent Application No. 11250645.6.

Office Action issued Mar. 19, 2012 in connection with U.S. Appl. No. 12/839,401.

Extended Search Report issued Mar. 15, 2012 in connection with European Patent Application No. 11250645.6.

Partial Search Report issued Nov. 2, 2011 in connection with European Patent Application No. 11250647.2.

Extended Search Report issued Mar. 15, 2012 in connection with European Patent Application No. 11250647.2.

First Action Pre-Interview Communication issued May 30, 2012 in connection with U.S. Appl. No. 12/839,216.

* cited by examiner

MONITORING SYSTEMS AND METHODS FOR AIRCRAFT LANDING GEAR

CROSS-REFERENCE TO RELATED APPLICATIONS

This application claims benefit of priority from U.S. Provisional Application Ser. No. 61/455,170, filed Oct. 15, 2010, U.S. Provisional Application Ser. No. 61/455,169, filed Oct. 15, 2010, and U.S. Provisional Application Ser. No. 61/393,456, filed Oct. 15, 2010, each of which is incorporated by reference herein in its entirety.

BACKGROUND OF THE INVENTION

1. Field of the Invention

The present invention is directed to systems and methods for monitoring the mechanical health and status of aircraft landing gear, and more particularly to systems and methods for monitoring the loads applied to an aircraft's landing gear structure, and still more particularly to landing gear monitoring systems that vary the sensor sampling rate and digital data resolution in order to conserve power during on-ground monitoring when the aircraft's power bus is shut down and a secondary energy source is used to power the monitoring system.

2. Description of the Related Art

Landing gear overload is a condition when the mechanical stress experienced by the landing gear structure exceeds or comes unacceptably close to the design limits. Existing or previously proposed landing gear monitoring systems focus on the detection of overload conditions due to hard landing events. In most aircraft currently in operation, a hard landing declaration is made by a pilot based on his or her subjective judgment.

Following a hard landing declaration, a series of inspections are undertaken to ascertain which components may have been damaged or excessively stressed. Such inspections are complicated, time-consuming and typically lead to significant loss of revenue by the aircraft operator. The overwhelming majority of hard landing declarations are later determined to be unreliable at predicting the mechanical health of the landing gear.

In some aircraft, recorded flight data such as, for example, altitude, velocity, and rate of descent may be used to assess the actual severity of the landing event. For example, U.S. Pat. No. 7,589,645 to Schmidt discloses an overload detection system that uses accelerometer measurements combined with flight data recorded by the avionics system to produce a hard landing diagnosis. Such a method is highly inaccurate, as it does not give sufficient information about the actual stresses experienced by the individual landing gear assemblies. Accuracy of this approach is limited by the fact that the acceleration experienced by the airframe does not translate directly into stresses experienced by individual landing gear assemblies.

Therefore, there is a need for a sensor-based system to objectively and accurately assess the degree to which the stress levels may have approached the design limits. Such an overload detection system would be able to confirm or disprove a hard landing declaration made by a pilot. If such a decision is made accurately and reliably, the operators may minimize flight operations and maintenance costs, while still assuring safe aircraft operation.

A novel system for predicting the forces applied to landing gear has been developed by the assignee of the present invention and has been described in a U.S. Provisional Patent Application No. 61/455,169. This system overcomes the limitations of the accelerometer-based monitoring by measuring mechanical strain in one or more locations on the landing gear, which are selected in such a way that the measured strain data, when taken collectively, allows determination of actual forces applied to the gear. An advantage of this approach is that it provides overload detection separately for each landing gear assembly. This is in contrast to the accelerometer and avionics-based methods, in which it is difficult to differentiate between the effects on left and right gear, for example. Furthermore, the new approach simplifies the inspection procedure by providing information as to which landing gear elements may have suffered damage.

Yet another benefit of the new method is that it is also applicable to low-velocity overload cases occurring during ground maneuvers, which are typically not associated with high acceleration levels. In contrast, the accelerometer-based method is limited to landing-related (high velocity) overloads. One of the leading causes of landing gear damage or excessive fatigue is towing-related overload. The nose landing gear is particularly susceptible to damage while the aircraft is being towed. This issue is known to the operators as 'tug abuse'. If the towing truck crew does not strictly follow the aircraft towing procedures, the landing gear may be subjected to large stress levels without the aircraft crew's knowledge. The new monitoring system discussed above allows detection of such overload cases by estimating the actual mechanical load on the landing gear during the ground operations. The system saves the stress data and provides the flight deck crew with information about any recent possible overload events. This offers a solution to the tug abuse detection problem.

However, a practical complication to the tug abuse monitoring issue is the power supply problem. It occurs quite frequently that an aircraft will be towed when all its electrical systems are powered down. This may occur when an aircraft has been parked, perhaps for a few days, and is being towed to another area of the airport, for example to be put into service again. In such cases there may be no flight crew present and any possible landing gear overload could go unnoticed. If the monitoring system operates solely from the aircraft power, then it will be inoperative and miss such cases. An alternative is to operate the system using a dedicated battery. This however means that the length of the system operation may be limited by the practical battery size and weight. In order to successfully detect overload cases that cannot possibly be predicted beforehand, the system must monitor the measured signals continually without any prolonged sleep times. Continuous operation of multiple sensors may require a significant power draw, limiting the useful battery life. If the battery is depleted and the system stops operating before the towing starts, any overload event will go undetected.

Thus, there is a need to design a low-power system for monitoring loads applied to landing gear when the aircraft is on the ground and its power bus is shut down.

SUMMARY OF THE INVENTION

Existing or previously proposed landing gear monitoring systems focus on detection of overload conditions due to hard landing events, but do not address the issue of on-ground operations when the aircraft systems may be powered down.

These so called tug-abuse incidents are a leading cause of landing gear damage and are difficult to detect. The systems and methods disclosed herein allow for long-term monitoring of the landing gear status while the rest of the aircraft is powered down. To make it independent from the rest of the aircraft, the system operates on a battery—either disposable or rechargeable. The data relevant to possible overload events is saved in memory to be later transmitted to the aircraft management system, when the aircraft is powered up again, or to a portable device brought by the ground maintenance crew.

In preferred embodiments of the present system the system's energy consumption is adjusted by adaptively changing the sensor sampling rate. Sensor data is acquired less frequently when the landing gear status remains unchanged, and the data acquisition frequency is increased if rapid changes are detected in the landing gear status. This allows limiting the average power draw and extending the battery life, thus making the system most useful in scenarios where the aircraft may be powered down and parked for a prolonged period of time.

The present invention is also directed to a method for monitoring loads applied to an aircraft's landing gear structure. The method includes the step of interrogating one or more sensors positioned proximate the landing gear structure via data acquisition circuitry to yield strain data. The method further includes the step of instructing the data acquisition circuitry as to a sampling rate and data resolution to be used for the step of interrogating the one or more sensors.

The method can further include increasing the sampling rate and/or the data resolution used for the step of interrogating when the strain data or strain vector data exceeds a predetermined threshold. The method of monitoring can further include the step of reducing the sampling rate and/or data resolution used for the step of interrogating when the strain data or strain vector data is below a predetermined threshold. The predetermined threshold can be one of a positive strain threshold, a negative strain threshold, and a rate of change threshold.

In certain embodiments, the method of monitoring further includes the step of storing the strain data in non-volatile memory. The method can further include the steps of processing the strain data to yield overload diagnosis data, and storing the overload diagnosis data in non-volatile memory.

The present invention also includes a system for monitoring loads applied to an aircraft's landing gear structure. The system includes one or more sensors positioned proximate a landing gear structure so as to be able to measure strain in the landing gear structure. A processor is in communication with the one or more sensors and is configured and adapted to receive strain data from the one or more sensors.

The system can further include data acquisition circuitry in communication with the one or more sensors and in communication with the processor for interrogating the one or more sensors so as to acquire strain data therefrom. The system can further include non-volatile memory in communication with the processor for storage of strain data.

It is also envisioned that the system can include a data concentrator unit in communication with the processor. Non-volatile memory can be in communication with the data concentrator unit for storage of strain data. The system can further include a power supply module for providing power to the processor. The power supply module includes first and second voltage regulators and a power switch. The first voltage regulator is adapted and configured to receive power from an aircraft power bus and the second voltage regulator is adapted and configured to receive power from a rechargeable battery.

The system can also include a sensor control unit in communication with the one or more sensors and positioned proximate the landing gear. The sensor control unit includes data acquisition circuitry for interrogating the one or more sensors so as to acquire strain data therefrom. The sensor unit further includes a processor in communication with the data acquisition circuitry, and a memory module in communication with the processor for storing strain data.

In certain embodiments, a data concentrator unit is provided in communication with the sensor control unit to process strain data received from the sensor control unit to yield overload condition data. The data concentrator can include a processor for processing the strain data received from the sensor control unit, and a memory module in communication with the processor for storing overload condition data.

These and other features and benefits of the subject invention and the manner in which it is assembled and employed will become more readily apparent to those having ordinary skill in the art from the following enabling description of the preferred embodiments of the subject invention taken in conjunction with the several drawings described below.

BRIEF DESCRIPTION OF THE DRAWINGS

So that those skilled in the art to which the subject invention appertains will readily understand how to make and use the systems and method of the subject invention without undue experimentation, preferred embodiments thereof will be described in detail herein below with reference to certain figures, wherein.

DETAILED DESCRIPTION OF PREFERRED EMBODIMENTS

Disclosed herein are detailed descriptions of specific embodiments of the systems and methods for monitoring the health and status of aircraft landing gear. It will be understood that the disclosed embodiments are merely examples of ways in which certain aspects of the invention can be implemented and do not represent an exhaustive list of all of the ways the invention may be embodied. Indeed, it will be understood that the systems, devices, and methods described herein may be embodied in various and alternative forms. The figures are not necessarily to scale and some features may be exaggerated or minimized to show details of particular components. Well-known components, materials or methods are not necessarily described in great detail in order to avoid obscuring the present disclosure.

Figures illustrating the components show some elements that are known and will be recognized by those skilled in the art. The detailed descriptions of such elements are not necessary to an understanding of the invention, and accordingly, are herein presented only to the degree necessary to facilitate an understanding of the novel features of the present invention.

Figure 1:
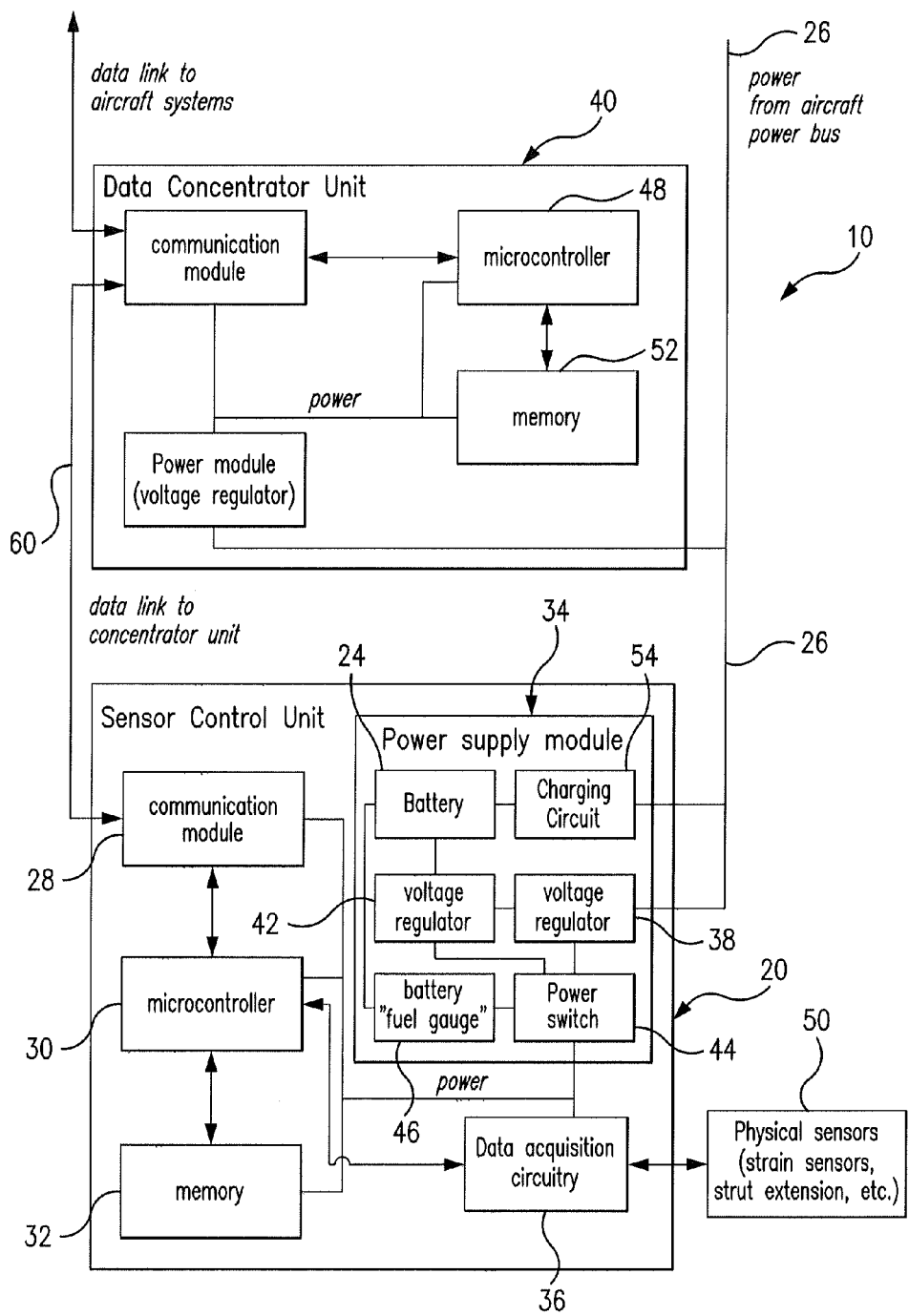
FIG. 1 is a block diagram of a landing gear health and status monitoring system which has been constructed in accordance with an exemplary embodiment of the present invention.

Referring now to the drawings wherein similar reference numerals identify similar structural features or aspects of the subject invention, there is illustrated in FIG. 1, a landing gear health and status monitoring system which has been constructed in accordance with an embodiment of the present invention which has been designated as reference numeral 10.

Landing gear monitoring system 10 uses a dual-power source concept. The aircraft's electrical power supply is used when available (i.e. when the aircraft is powered up) and battery power is used when the aircraft power is not available (e.g. when the aircraft is parked and powered down). A key feature of certain embodiments of the present invention is to adjust the mode of battery-based operation based on the measured strain signals, such that power consumption is minimized and battery life is greatly extended. The parameters adjusted are the sensor sampling rate and the digital data resolution, since in most instances, power consumed increases with higher sample rates. As described in more detail herein below, depending on the measured signals, the system may increase the sampling rate and/or signal resolution (e.g., data acquisition resolution) only during the periods when strains are increasing and overload detection is more likely. When strain values remain low, the system may decrease the sampling rate and data acquisition resolution, to limit the power draw.

FIG. 1 illustrates the general system architecture. A sensor control unit 20 is powered either from a rechargeable battery 24 or from the wired aircraft power supply 26. A data concentrator unit 40 is powered solely from the aircraft power supply system 26. The data concentrator unit 40 and the sensor control unit 20 typically will be mounted in different locations on the aircraft. The sensor control unit 20 should preferably be located close to sensors 50, which may be near the landing gear axle. Hence the sensor control unit 20 may need to be small and lightweight. Also, because it may be powered at times from battery 24, the sensor control unit 20 will be built using low-power components which will allow only limited computations. The data concentrator unit 40 may require more power and may perform more detailed computations to obtain overload diagnosis.

To understand how landing gear monitoring system 10 employs variable mode sensing, it is useful to consider the diagram of the sensor control unit 20. The sensor control 20 unit includes: a communication module 28, a microcontroller 30, a memory 32, a power supply module 34 and data acquisition circuitry 36. The sensors 50 are interrogated not directly through an A/D converter associated with microcontroller 30, but through separate data acquisition circuitry 36.

In monitoring system 10 illustrated in FIG. 1, the sensors 50 are capacitive strain sensors and the data acquisition is performed through a specialized ASIC (Application Specific Integrated Circuit). The microcontroller's A/D converter can be used to measure voltage, but can not measure capacitance directly. In order to accomplish this, the measured capacitance needs to be converted to voltage. The ASIC converts the capacitance to voltage and then performs the A/D conversation. Preferably, a separate chip is used for each sensor so that each sensor can be interrogated simultaneously and the acquired data can be synchronized. Those skilled in the art will readily appreciate that there may be separate data acquisition chips for separate sensors, even though only one such chip is shown in the diagram.

During data acquisition, the data acquisition circuitry 36 energizes the sensors 50, takes a reading and sends it to the microcontroller 30, after which the sensors 50 are de-energized until the next reading. The power consumed by the data acquisition circuitry 36 and the sensors 50 depends on the frequency with which they are interrogated. In some sensor types, energizing the transducer (or the sensing element) and then performing the A/D conversion may be more energy consuming than other aspects of the sensor operation. By reducing the sampling rate, the percentage of time when the transducer and A/D circuitry are energized is lower, which leads to lower energy use. Also, duration of the data acquisition operation, and hence the power consumption, depends on the bit resolution of A/D conversion. Lowering the bit resolution often results in a shorter conversion time, leading to lower duty cycle and ultimately lower energy use.

Therefore the microcontroller 30 may regulate the power draw level by adjusting the sensor sampling rate and the bit resolution. Note that the microcontroller 30 may analyze the acquired data and perform other functions during periods when the sensors are not being interrogated. Thus the activity levels and duty cycles of the microcontroller 30 and of the sensors 50 may be decoupled, and lowering the power consumption does not require putting the entire sensor control unit 20 to sleep.

The system 10 disclosed in FIG. 1 includes two voltage regulation circuits. The first voltage regulator 38 is used to convert the aircraft power supply 26 to the level required by the system, as typically the aircraft power supply voltage will be much higher than what is required by the system electronics. The second voltage regulator 42 is used when the system is operated from the battery whose voltage may vary in time as the battery's charge is depleted. A power switch circuit 44 associated with power supply module 34 selects the power source depending on availability of the aircraft power. In a practical implementation the function of these three modules may be performed by a single voltage regulator able to deal with both the battery and with the aircraft power.

In the diagram, the physical sensors 50 are shown outside of the sensor control unit 20, to signify the fact that the control unit 20 need not be collocated with the actual physical sensors/transducers 50. In other implementations or embodiments, some sensors may be integrated with the control circuitry into a single physical module. However, some sensors may still be removed by a short distance from their respective control units and connected through a short wired connection (a so-called pigtail) or transmitting collected data wirelessly.

Figure 2:
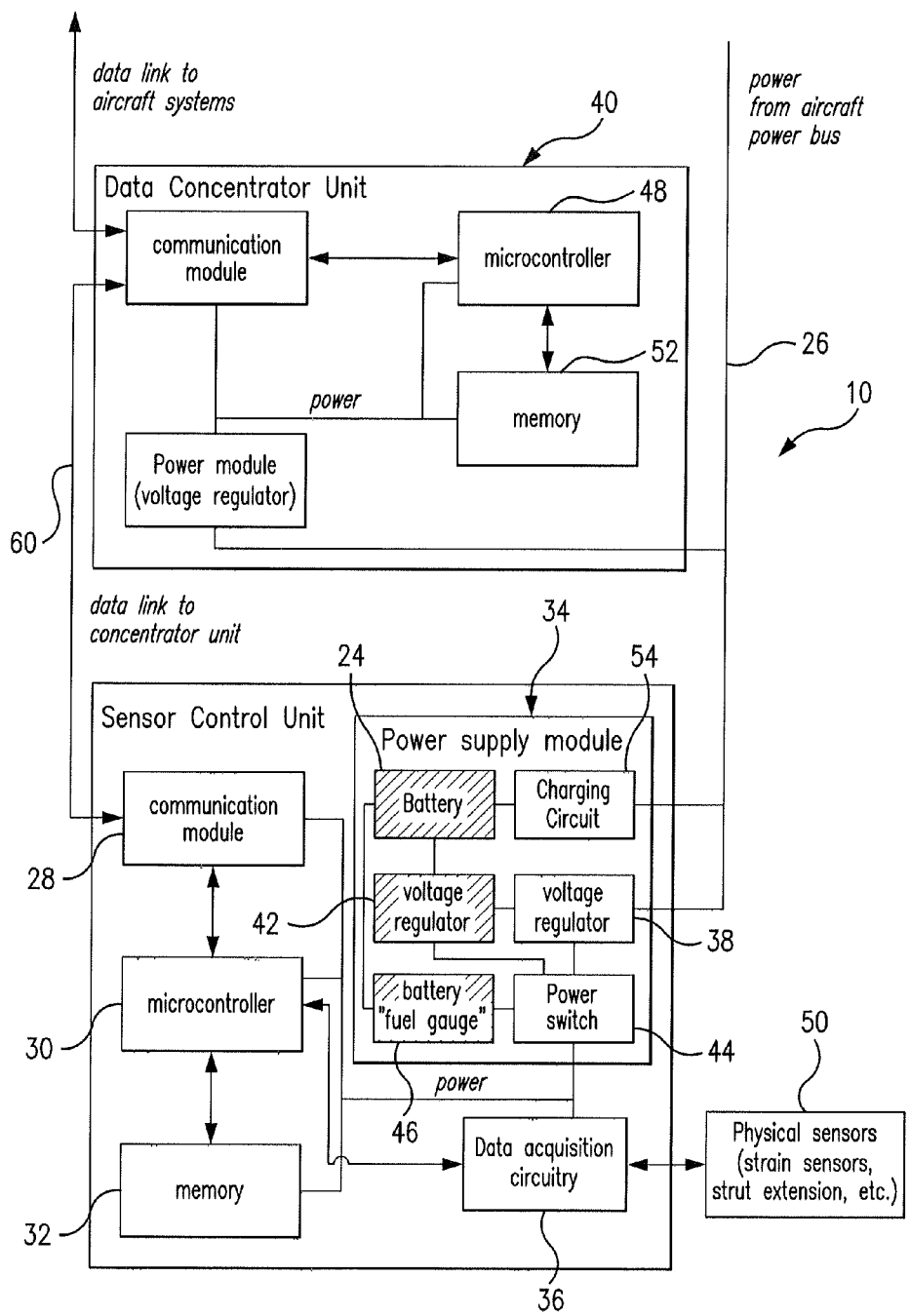
FIG. 2 is a block diagram of the landing gear health and monitoring system as illustrated in FIG. 1, wherein the system (data concentrator unit and sensor control unit) is being powered by the aircraft's power bus.

When the aircraft power supply is available, the entire monitoring system 10 operates on aircraft power. FIG. 2 illustrates the mode of operation for system 10 when the aircraft power 26 is available. The elements shaded in gray, battery 24, voltage regulator 42 and battery fuel gauge 46, do not take part in the system operation in this mode. The battery 24 within the sensor control unit 20 is being recharged; it is not used as the power source. In this mode, the sensor control unit 20 may operate at a high data rate and at high bit resolution, as electrical power is freely available and need not be severely conserved. Note that this mode of operation typically corresponds to take-off, landing, or taxiing to and from the gate. At these times the landing gear is more likely to experience high-velocity, abrupt overload incidents, such as hard landing or hitting an obstacle on the runway. Because the system is operated at full (high) sampling rate and high bit resolution, such incidents may be detected and reported to the crew or maintenance personnel.

The sensor data may be transmitted to the data concentrator unit 40 using communication module 28 and over data link 60 soon after it has been acquired. Depending on the type of the data link, as explained later, all or only a part of the acquired sensor data may be sent to the data concentrator unit 40. If only a portion of the data is sent, then the microcontroller 30 within the sensor control unit 20 must perform suitable data reduction. This may be based on approximate analysis of strain measurements to asses if an overload condition is even remotely likely. However, this analysis will not be very accurate, due to the limited computational resources of the sensor control unit 20 so designed to limit battery power consumed in operation. On the other hand, the data concentrator unit 40 may include a much more powerful microprocessor or microcontroller 48 and therefore may analyze the acquired data in greater detail. The resulting overload diagnosis data may then be sent to the aircraft maintenance system. It may also be stored in memory module 52 for later use, together with the supporting sensor data. It may be advantageous that the data concentrator unit's memory 52 be at least in part non-volatile in order to preserve the previous overload information. For example, if an overload occurs at the end of one taxiing period, just prior to turning down the aircraft, it may be useful to have this information when the aircraft is powered up and ready to taxi again.

Note that this powered mode of operation may be needed only when the landing gear is deployed. If it is retracted there may be no reason to monitor possible overloads. Therefore the entire system may be switched off, based on the landing gear bay door status or on another sensory system indicating that the gear is retracted. In present disclosure we consider only the operation when the landing gear bay door is open and the landing gear is deployed.

Figure 3:
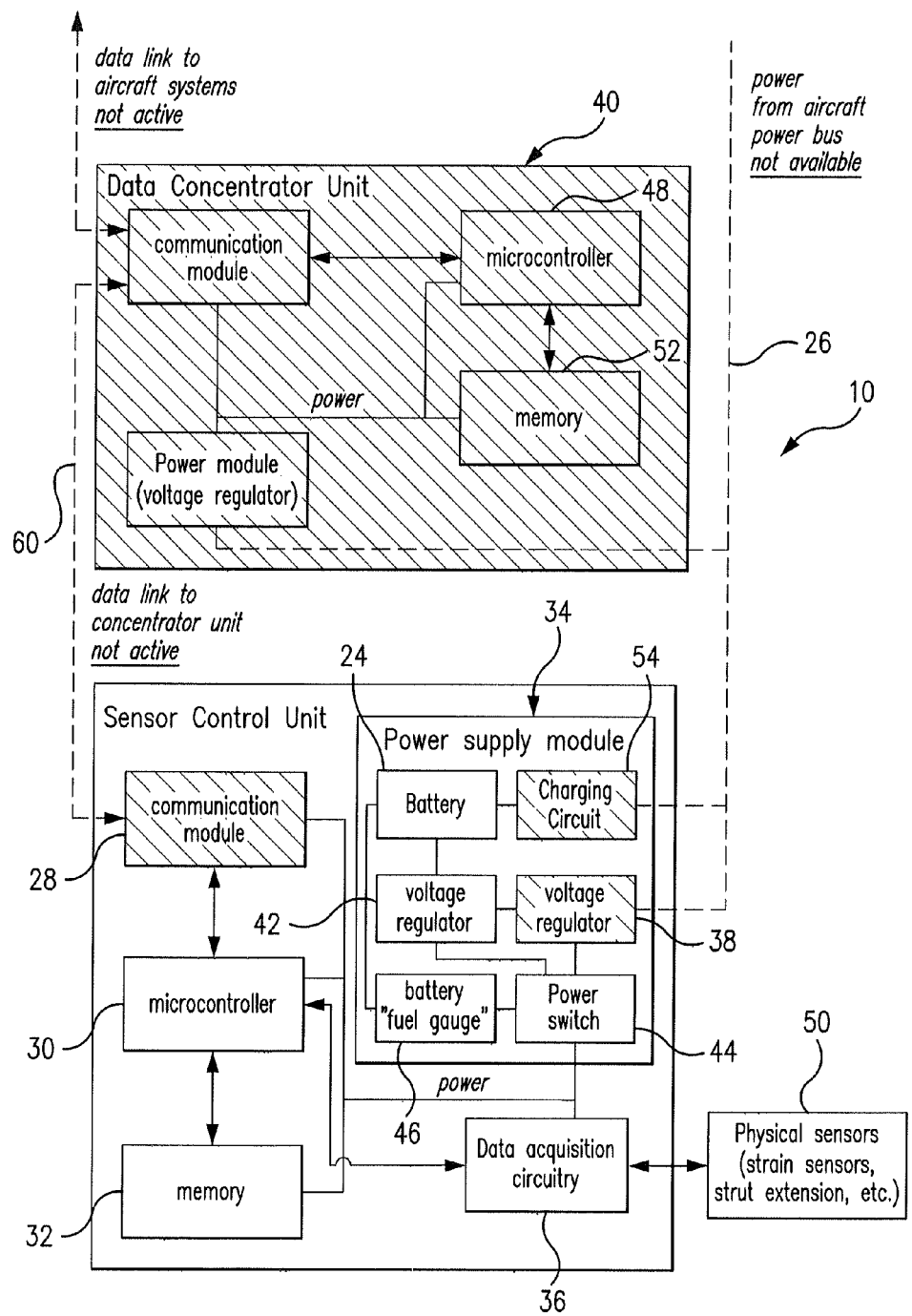
FIG. 3 is a block diagram of the landing gear health and monitoring system as illustrated in FIG. 1, wherein the data concentrator unit is shut down and the sensor control unit is being powered by a battery.

When the aircraft is not powered, the data concentrator unit 30 is switched off and the sensor control unit 20 uses its internal rechargeable battery 24 as the power source. FIG. 3 illustrates the configuration of system 10 when the aircraft is not powered and the modules that are switched off in this mode, data concentrator unit 40, communication module 28, charging circuit 54, and first voltage regulator 38, are shown shaded in gray.

As the data concentrator unit 40 is without power, no data will be transmitted from the sensor control unit 20. Likewise, no data is sent to the aircraft maintenance system. This means that the sensor control unit 20 must retain the data related to the suspected overload events. To accommodate the possible case of the battery reaching a completely discharged state after an overload event is recorded, at least a part of the sensor control unit's memory 32 is non-volatile so that the data remains available once the aircraft is powered up again.

With the battery power being limited, the sensor control unit 20 interrogates sensors 50 at a lower sampling rate and with lower bit resolution to conserve energy. Note that the un-powered mode of operation corresponds to the case when the aircraft is parked or at worst towed at relatively low velocities. Therefore the expected rate of change of the strain readings may be much lower than, for example, during take-off or landing. This allows keeping the total power consumption low throughout a majority of the parked period. If the sampling rate is sufficiently low, the microcontroller 30 may enter a low-power ('sleep') mode between the consecutive sensor samples. However, note that the sleep periods of the microcontroller 30 will not be equivalent to the periods when the data acquisition circuitry 36 and the sensors 50 are de-energized. The microcontroller 30 may be reading the data sequentially from the different sensors while operating at a slower rate. Also, after acquiring the data, the microcontroller 30 must analyze it to decide whether the sampling rate should be increased or not. Depending on the microcontroller's type, these calculations may take a significant portion of the period between consecutive sensor readings. Therefore the percentage of time when the microcontroller 30 may be in a sleep mode will be lower than the percentage of time when the data acquisition circuitry is not active and the sensors 50 are not being read.

Activation of High Data Rate Monitoring

An important feature of the monitoring system 10 is the rapid adjustment of its operation based on the sensed signals, so that a possible overload event is not missed. The low power, low data rate operation is suitable for monitoring the landing gear during the quiescent periods. However, when a suspected high-load event occurs, the recorded data must be accurate enough to allow correct determination of whether stress exceeded the overload limits. This means that sensor data to be analyzed must be acquired at a high sampling rate and with high data resolution. Accordingly, system 10 will adjust its operation when a suspected high-load event may occur. This will be done based on a combination of decision criteria. The simplest approach is to define threshold values $\theta^{hi}$ and $\theta^{lo}$ for positive and negative strain, indicating a condition outside of the normal scope of operation. These detection thresholds may be different for individual sensors, based on their locations. When a sensor reading $x_i$ exceeds one of these thresholds, i.e. $x_i < \theta_i^{lo}$ or $x_i > \theta_i^{hi}$, the system may switch to high data rate operation.

Another criterion, used in conjunction with simple level thresholding, may be based on thresholds for rate of change. For example, the decision trigger may be $|x_i(t+\Delta)-x_i(k)|/\Delta > \alpha_i$ where $\Delta$ is the time step used to estimate the rate of change, and $\alpha_i$ is the corresponding threshold for the rate of change for the i-th sensor. Other, more complicated methods to estimate the rate of change may be used, as will be appreciated by those skilled in the art. Using the rate of change information the system may quickly increase the sensor sampling rate at the very beginning of an overload event, even if the strain readings are still low. This may allow lowering the sample rate during the low-rate monitoring periods without sacrificing detection accuracy. Once the sample rate is increased, it would remain at a high rate for a prescribed period of time or until the data suggests that the strain event is passed.

It should be noted that different threshold values may be applied in different combinations, using more complicated logical decision criteria. For example, threshold values $\theta^{hi1}$ and $\theta^{lo1}$ may be defined for slowly changing strain conditions, and a different set of threshold values $\theta^{hi2}$ and $\theta^{lo2}$ may be defined for use when strain is changing faster. Then the trigger condition to switch to a higher sampling rate operation may be a combination of two logical conditions: a slow change criterion ($x_i < \theta_i^{lo1}$ or $x_i > \theta_i^{hi1}$); and a fast change criterion (($x_i < \theta_i^{lo2}$ or $x_i > \theta_i^{hi2}$) and $|x_i(t+\Delta)-x_i(k)|/\Delta > \alpha_i$). It will be readily appreciated by those skilled in the art that other combinations of logical thresholding criteria may be used, using multiple threshold values defined for different operational conditions. The specific choice of the decision criteria used for a particular landing gear will depend on the mechanical characteristics and operational profiles of the aircraft.

Figure 4:
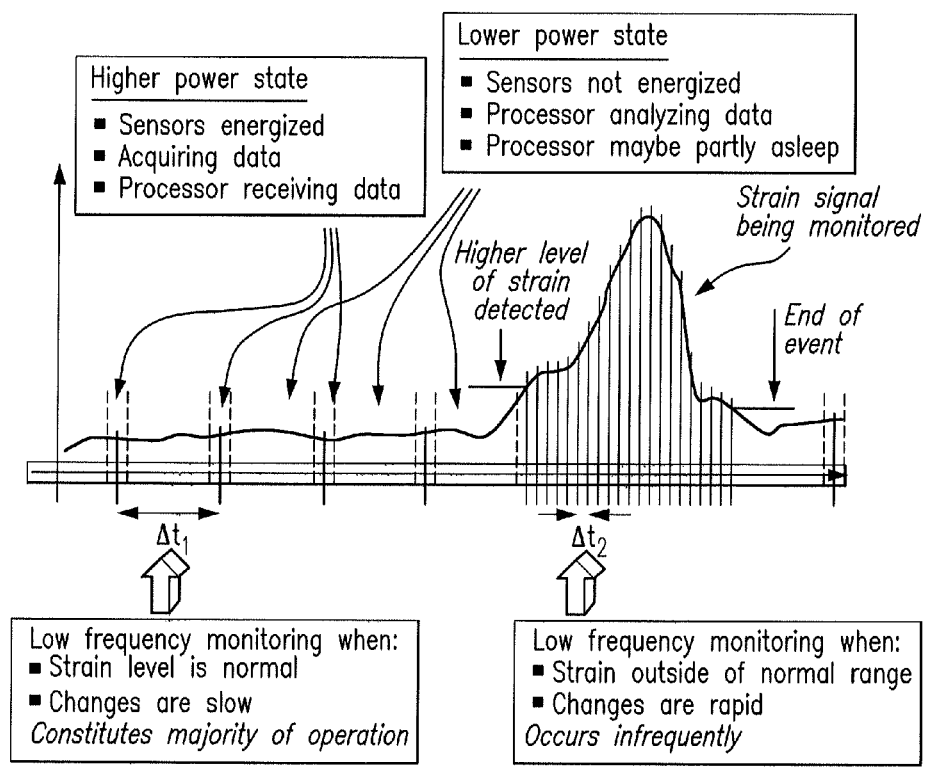
FIG. 4 is a graphical representation of the variable rate monitoring that is performed by the system illustrated in FIGS. 1 through 3.

FIG. 4 illustrates the general concept of switching between high and low sensor sampling rates for the case of a single sensor reading. Note that the end of the high-rate monitoring may be associated with another, lower threshold value. This will prevent the system from continual switching between the two data rates when the signal value is close to the threshold, and ensure that the towing episode has indeed ended before the system returns to the quiescent mode of operation.

It should be noted that thresholding of individual strain signals may not be sufficient to capture all the possible overload cases. There is a possibility that during particular events none of the individual strain readings will fall outside of its normal range, even though taken collectively they indicate a significant change of the loads applied to the landing gear. To account for this possibility the microcontroller 30 may estimate the actual applied loads based on the measured strain vector. As mentioned previously, a method of estimating the mechanical loads imparted on the landing gear based on measured strain values is described in detail in a U.S. Provisional Patent Application No. 61/455,169. As this method involves matrix multiplication, and other calculations that require more processor cycles, it may be performed less often, perhaps only every few data acquisitions. Then appropriate thresholds for load values and their data rates may be used similarly as described above for the strain signals. An actual system implementation will use a suitable combination of different thresholds for individual strain signals and for estimated load values.

Although this discussion assumes only one low data rate mode and one high data rate mode, a system implementation may use more than two modes, with several data rates ranging from the lowest, used when the aircraft is completely still, to the highest, used when high loads are known to be applied to the landing gear. Intermediate data rates may also be used to monitor stresses when there is some indication of aircraft movement but the likelihood of a towing event is judged to be low. Switching between the multiple operating modes may be done based on multiple thresholds, as described above.

When a suspected tug-abuse related overload episode is over, the sensor control unit 20 will retain the acquired sensor data, so that it can be sent to the data concentrator unit 40 once the aircraft is again powered up. Because the memory 30 of the battery-powered sensor control unit 20 may be limited, some data reduction may be required. For example, the system 10 may retain the data corresponding to a fixed time interval around the estimated peak stress instance. The microcontroller 30 may estimate the moment when the maximum stress occurred and data before and after that moment may be retained. Alternatively, the extreme (maximum or minimum) values for individual strain sensors may be estimated, and intervals around each maximum or minimum may be used to bound the retained data. If such intervals overlap, because of the peak values occurring close to each other, then union of those intervals may be used for saving the sensors data. Various combinations of these methods are possible, as would be obvious to those skilled in the art.

When an aircraft is parked for a prolonged period, the system may activate the higher data rate monitoring multiple times. Some of those instances may not correspond to actual overloads. When multiple events are recorded, the memory available on the sensor control unit may be insufficient to retain all the data. Subsequently the data corresponding to less severe loads may be overwritten with new data. For this, each event record should be accompanied by an indicator, or a set of indicators associated with the estimated severity of the event. This may include the peak strain values, the peak load values etc. The number of events recorded and their length will depend on a tradeoff between the necessary accuracy of overload detection and the cost, size and energy use of a larger memory unit.

It is envisioned that system 10 can be modified in a number of ways based on the particular application or aircraft without departing from the inventive aspects of the present disclosure. Several variants of the system architecture are described below that do not affect the general idea of the system. All the concepts discussed above apply to all the variants below.

Single Vs. Multiple Sensor Units

The preceding disclosure involved a single sensor control unit communicating with the data concentrator unit. In some system implementations more then one sensor control unit may be used with the same data concentrator unit. For example, more than one cluster of sensors may be used on a landing gear. In this case it may be not practical to connect them both to the same sensor control unit. Instead, it may be advantageous to have one group of sensors located close to each other connected to one unit, while other sensors may be connected to other units. When the aircraft is powered up, the batteries of all sensor control units are recharged from the aircraft power supply system. When the aircraft is un-powered, each sensor control unit operates on its own battery and decides autonomously when and how to adjust the sensor sampling rates. Because each unit has only a partial picture of the overall landing gear state, the thresholds used to activate the higher data rate mode may be appropriately lowered to avoid missing some of possible overload events.

Location of the Data Concentrator

In the diagrams the data concentrator unit is drawn as physically separate from the sensor control unit. In some implementations, these two units may be just two functional modules within the same physical enclosure. The module described above as the data concentrator may use a high-powered processor necessary for accurate overload estimation during high-velocity events such as landing. This module may need much more energy and thus will be powered from the aircraft's power supply. The module described as the sensor control unit may use a low-power microcontroller and may be used when the aircraft is powered down to record the suspected tug abuse-related overload cases. This unit may perform only approximate signal analysis and uses accordingly less power; therefore it may be powered from the battery. Even if the two units are collocated, all the system concepts described above may apply.

Elimination of the Data Concentrator Unit

In certain applications, a data concentrator unit may not be required. As noted above, one function of the data concentrator unit is to perform complex and energy consuming calculations in order to determine if an overload condition has occurred. The data concentrator unit also serves to convert the data from a format used by the sensor control unit to the native format of the aircraft main computer. However, these functions can be incorporated into the aircraft's main computer, the aircraft's Health and Usage Monitoring System and/or the sensor control unit making the data concentrator unit unnecessary. However, one disadvantage to eliminating the data concentrator unit is that it may require the size of the sensor control unit to be increased which in certain applications is undesirable.

Wireless Vs. Wired Data Transfer

Data transfer between the sensor control unit (or units) and the data concentrator may be via a wired connection, using any of the standard data transfer protocols used in avionics. Alternatively, wireless data transfer may be used. Even though a wired power supply is necessary for each sensor control unit, providing an additional data connection may be too costly and cumbersome. Typically, data transfer wiring is more complex than power supply wiring, and may require additional design and installation. Also, the overall system weight may be driven up by data wires. For these reasons, the data links between the sensor control unit (or units) and the data concentrator, as well as between the physical sensors and the sensor control unit, may be implemented using wireless technology.

Data Recipient Aircraft System Vs. Ground Base Station Vs. Handheld Receiver

In the system diagrams provided in FIGS. 1-3, the recorded sensor data and the overload diagnosis is sent to the aircraft management computer or another avionics system installed in the aircraft. This approach presumes that the aircraft management system is designed to accept and process such data.

In retrofit applications the existing aircraft computer system may be not able to interface to the newly installed landing gear monitoring system. In this case the monitoring system may be designed to transfer its data to a handheld device operated, for example, by a ground mechanic. This connection may be accomplished wirelessly, through a wire temporarily plugged into a connector in the data concentrator unit, or via a memory device (such as flash drive) plugged into the data concentrator unit and then to the handheld device. Another alternative may be a wireless connection to a ground station computer used by the maintenance crew. Regardless of the final destination of the data, all the system concepts described above still apply.

Those skilled in the art will readily appreciate that the monitoring systems and methods disclosed herein could also utilize additional sensors for dictating or determining whether the system should increase the sampling rate and data resolution. For example, an accelerometer could alert the system as to when the aircraft is being jacked up or towed.

Moreover, although the previously described embodiments utilize a rechargeable battery as the secondary energy source for the system, other energy sources, such as energy harvesting can be employed if practicable based on the environment in which the system is deployed.

While described above in the exemplary contest of microcontrollers, those skilled in the art will readily appreciate that any suitable processor can be used. A typical processor is configured of logic circuitry and responds to and executes instructions. The term "module" is used herein to denote a functional operation that may be embodied either as a stand-alone component or as an integrated configuration of a plurality of sub-ordinate components.

While the subject invention has been described with respect to preferred embodiments, those skilled in the art will readily appreciate that changes and modifications may be made thereto without departing from the spirit and scope of the subject invention as defined by the appended claims.

What is claimed is:

1. A monitoring system for on-ground monitoring of loads applied to an aircraft's landing gear structure, comprising:
   a) one or more sensors positioned proximate the landing gear so as to be able to measure strain in the landing gear structure;
   b) a sensor control unit in communication with the one or more sensors and positioned proximate the landing gear, the sensor control unit including:
      i) data acquisition circuitry for interrogating the one or more sensors so as to acquire strain data therefrom;
      ii) a first processor in communication with the data acquisition circuitry; and
      iii) a memory module in communication with the processor for storing strain data;
   c) a data concentrator unit in communication with the sensor control unit to process strain data received from the sensor control unit to yield overload condition data, the data concentrator unit including:
      i) a second processor for processing the strain data received from the sensor control unit to yield overload condition data; and
      ii) a memory module in communication with the second processor for storing overload condition data.

2. The system of claim 1, wherein the sensor control unit is configured to increase a sampling rate of the data acquisition circuitry when the strain data exceeds a predetermined threshold.

3. The system of claim 2, wherein the sensor control unit is configured to select the predetermined threshold from a group consisting of positive strain threshold, negative strain threshold, and rate of change threshold.

4. The system of claim 1, wherein the sensor control unit is configured to increase a data resolution of the data acquisition circuitry when the strain data exceeds a predetermined threshold.

5. The system of claim 4, wherein the sensor control unit is configured to select the predetermined threshold from a group consisting of: positive strain threshold, negative strain threshold, and rate of change threshold.

6. The system of claim 1, wherein the sensor control unit is configured to reduce a sampling rate of the data acquisition circuitry when the strain data is below a predetermined threshold.

7. The system of claim 1, wherein the sensor control unit is configured to reduce a data resolution of the data acquisition circuitry when the strain data is below a predetermined threshold.

8. The system of claim 1, wherein the second processor is configured to process the strain data received from the sensor control unit to yield estimated applied mechanical load data.

9. The system of claim 8, wherein the sensor control unit is configured to increase a sampling rate of the data resolution circuitry and a data resolution of the data acquisition circuitry when the estimated applied mechanical load data exceeds a predetermined threshold.

10. The system of claim 8, wherein the sensor control unit is configured to decrease a sampling rate of the data resolution circuitry and a data resolution of the data acquisition circuitry when the estimated applied mechanical load data is below a predetermined threshold.

11. The system of claim 1,
    wherein the sensor control unit is configured to increase a sampling rate of the data resolution circuitry and a data resolution of the data acquisition circuitry when the strain data exceeds a first predetermined threshold; and
    wherein the sensor control unit is configured to decrease the sampling rate of the data resolution circuitry and the data resolution of the data acquisition circuitry when the strain data falls below a second predetermined threshold.

12. The system of claim 1, further comprising:
    a power supply module for providing power to the first processor,
    the power supply module including first and second voltage regulators and a power switch,
    wherein the first voltage regulator is configured to receive power from an aircraft power bus, and
    wherein the second voltage regulator is configured to receive power from a rechargeable battery.

* * * * *